Patented Feb. 27, 1934

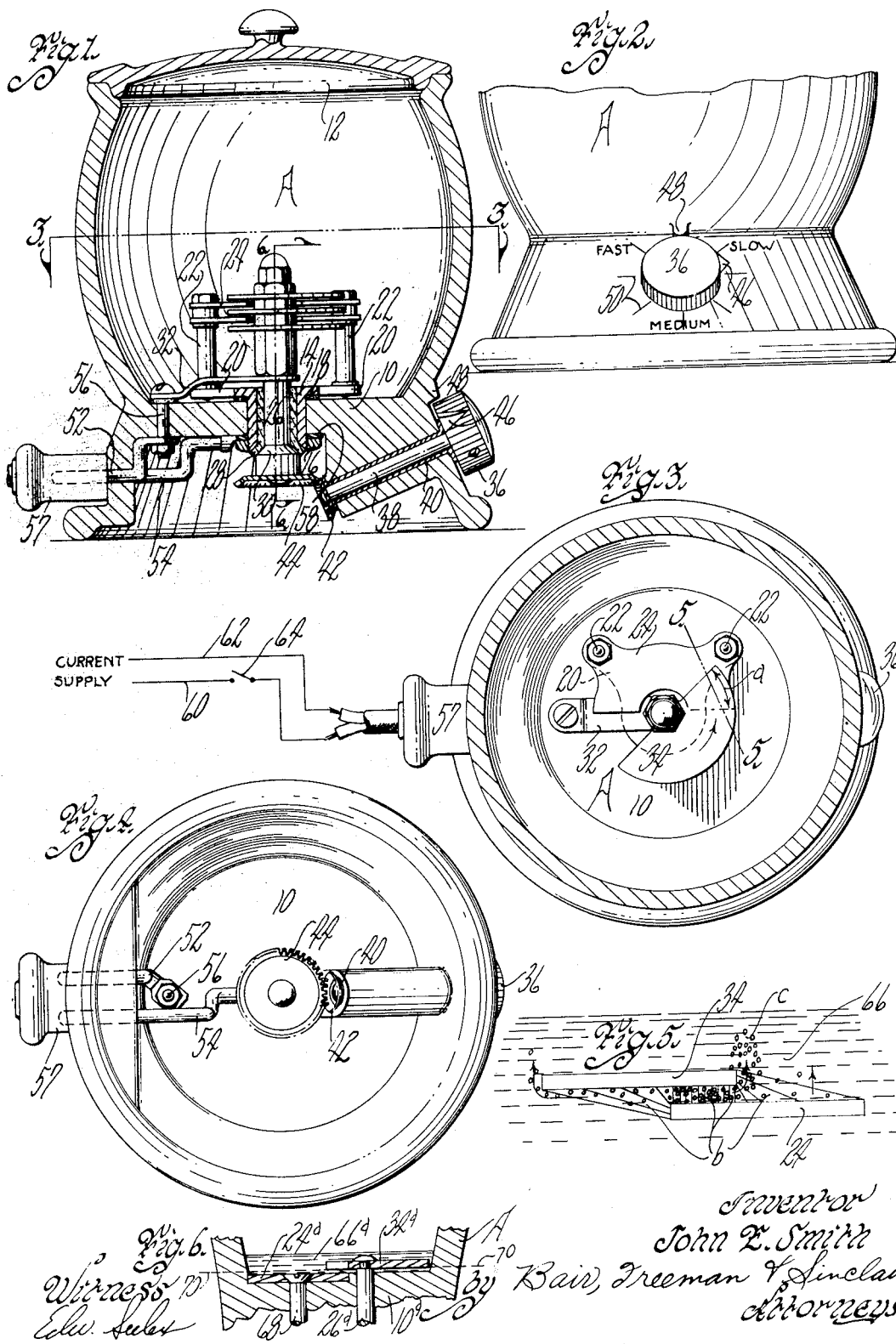

1,949,086

UNITED STATES PATENT OFFICE

1,949,086

IMMERSION HEATING ELEMENT

John E. Smith, Belleville, Ill., assignor to Knapp-Monarch Company, Belleville, Ill., a corporation of Missouri Application November 4, 1931. Serial No. 572,891

9 Claims. (Cl. 219—40)

One object of my present invention is to provide a heating element adapted for immersion in water or other liquid for heating the liquid upon the inclusion of the heating element in an electric circuit.

A further object is to provide a heating element of the immersion type which may be adjusted for controlling the quantity of current flowing from one electrode to the other of the heating element through the liquid in which the element is immersed and thereby controlling the heating of the liquid itself or the speed of its vaporization.

More particularly, it is my objcet to provide an immersion heating element having a pair of electrodes, the positions of which are adjustable relative to each other whereby to control the flow of current through the heating element.

Still a further object is to arrange the electrodes in normally overlapping position and provide means for manually adjusting the degree of overlapping, whereby the amount of current passing from one electrode to the other may be directly varied and consequently vary the heating of the liquid in which the device is immersed or the vaporization thereof.

Still a further object is to provide a liquid container with an immersion type heating element therein and including a rotatable shaft for adjusting the electrodes relative to each other with a control knob or the like mounted on the outside of the container for rotating the shaft and thereby adjusting the current flow.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a vertical sectional view through a liquid container with my immersion type heating element therein.

Figure 2 is a side elevation of the lower portion of the device.

Figure 3 is a sectional view on the line 3—3 of Figure 1 showing a plan view of the heating element.

Figure 4 is a bottom plan view of Figure 1.

Figure 5 is a diagrammatic view illustrating the action of the overlapping electrodes of the immersion heating element; and Figure 6 is a sectional view taken on the line 6—6 of Figure 1, but showing a modified form of construction for using the heating element as a vaporizer.

On the accompanying drawing, I have used the reference character A to indicate generally a liquid container. The liquid container A has a bottom 10 and a removable lid 12. A sleeve 14 extends through the bottom 10 and is retained in position by a nut 16. A gasket 18 prevents leakage of liquid from the container A around the sleeve 14.

The sleeve 14 has extensions 20 on which supporting posts 22 are mounted. The supporting posts 22 support spaced stationary electrodes 24, which may be of any desired form and are shown as flat plates on the drawing.

A shaft 26 extends through an insulating sleeve 28 in the sleeve 14. The shaft 26 has a seat shoulder 30 which is held against the flared lower end of the sleeve 28 by a leaf spring 32. The seat shoulder 30 engaging the flared portion of the sleeve 28 and such portion in turn engaging the lower end of the sleeve 14 and these parts held in contact by the spring 32 eliminate the necessity of packing around the shaft 26 and prevent the leakage of liquid from the container A through the sleeve 14.

The rotatable shaft 26 is provided with movable electrodes 34 which are also of plate like formation and in planes parallel with the planes of the electrodes 24. The electrodes 24 and 34 are staggered relative to each other, as clearly shown in Figure 1 of the drawing and any number of them may be provided. With a greater number of electrodes, a heavier current flow is possible and electrodes having larger surfaces would also increase the current flow so that the heating element may be designed for any size of liquid container and any current flow desired.

The electrodes 24 and 34 normally overlap, as indicated by the arrow $a$ in Figure 3 and by rotating the shaft 26, the degree of overlap may be increased or decreased as desired. In order to conveniently rotate the shaft 26, I provide a manually operable control knob 36 which may be operatively connected with the shaft 26 in any desired manner. I have shown it as being mounted on a shaft 38 extending through a sleeve 40 which in turn extends through the base of the liquid container A. A bevel pinion 42 on the shaft 38 meshes with a bevel gear 44 on the shaft 26.

The knob 36 may be provided with a pointer 46 and unnecessary overoperation of the knob 36 may be prevented by a stop shoulder 48 with which the pointer 46 will engage upon extreme rotation of the knob 36 in either direction. Suitable indicia, such as "slow", "medium" and "fast", as shown in Figure 2 and indicating marks 50 may be provided on the base of the container A for the convenience of the user.

To include the electrodes 24 and 34 in an electric circuit, I provide contact prongs 52 and 54 on which a connector plug 57 may be positioned. The prong 52 connects with a bolt 56 which holds the spring 32 in position and the bolt and spring thereby serve as an electric connection between the prong 52 and the movable electrodes 34 on the shaft 26. The prong 54 is connected with a washer 58 under the nut 16, so that the sleeve 14, extensions 20 and posts 22 serve to establish connection between the prong 54 and the stationary electrodes 24.

Lead wires 60 and 62 connect with the plug 57 for including it in an electric circuit and a suitable switch 64 may be provided for establishing the flow of current to the electrodes or cutting off such flow.

In Figure 6, a modified form of construction is shown in which the stationary electrode 24a is embedded in the bottom 10a of container A'. It may be retained in such position and electric connection may be made through a screw 68. The rotatable shaft 26a may be controlled in the same manner as the shaft 26 and has the movable electrode 34a mounted thereon. This heating element is like the heating element shown in Figure 1 except that it is as close to the bottom 10a as possible and has only two electrodes. It is especially desirable for use as a vaporizer of the liquid 66a which, upon a maximum of vaporization, will reach the level 70. This arrangement serves as a timing device, as will hereinafter be disclosed. The electrodes 24a and 34a are substantially the same shape as the electrodes 24 and 34.

*Practical operation*

Although I have shown my immersion heating element as a heater and/or vaporizer for liquid in a liquid container, it may be combined with any sort of utensil in which liquid is to be heated, such as a tea or coffee pot, or the device may be used for boiling or steam cooking different articles, such as eggs or the like and if desired a shield can be mounted over the heating element to prevent such articles from touching it.

The primary object of the invention is to provide an immersion heating element which is capable of adjustment so that the rate of heating and/or vaporization of the liquid can be controlled.

Referring to Figure 5, the straight lines b indicate the path of current from one electrode to the other one through the liquid 66. Where the electrodes overlap, the lines b are more closely crowded than where they do not overlap. This is to represent the fact that there is a heavier current flow between the overlapping portions than there is between the portions which do not overlap. The heavier current flow will heat the liquid quicker and form steam bubbles c quicker. The portions that do not overlap will form steam bubbles to some extent but not nearly so many as between the overlapping portions. It is, therefore, evident that the greater the degree of overlapping, the faster the heating of the liquid occurs, or in the vaporizer type, complete vaporization is finished more quickly.

In the vaporizer type of Figure 6, different indicating characters other than "slow", "fast" and "medium" can be used, such as "2", "3", "4", etc., indicating that when a given quantity of liquid 66a is placed in the receptacle A' it will be completely vaporized at the end of 2, 3 or 4 minutes. Thus the device can be used as a steam cooker for eggs and the timing varied as desired and yet the same quantity of water (for instance a tablespoonful) can be placed in the receptacle A' for each egg cooking operation.

It will also be obvious that the greater the overlapping of the electrodes the heavier the current flow will be and consequently heating or vaporization may be controlled in any desired manner. For instance, the knob 36 can be set at "fast" for quickly bringing the water to the boiling point and then set at "slow" for holding it at the boiling point without actually continuing the boiling. When it is desired to heat the water more slowly, it may be set at "medium" or any point desired and thus the heating is effectively controlled by adjusting the overlapping relationship of the electrodes. In the case of the vaporizing electrodes in Figure 6, the vaporization period can be controlled, depending of course on the quantity of liquid placed in the receptacle.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a liquid heater, a liquid container, a sleeve through the bottom thereof, an electrode rigidly supported by said sleeve, a shaft through said sleeve and a second electrode on said shaft and capable of movement relative to said first electrode when said shaft is rotated.

2. In an immersion heater, a container, a pair of electrodes therein and normally spaced from and overlapping each other and depending on liquid for conveying electricity from one electrode to the other one, one of said electrodes being movable to vary the degree of such overlapping and having an adjusting shaft extending through the bottom of said container, said bottom having a sealing shoulder, said shaft having a flange for coaction therewith and means to retain said flange in sealing engagement with said shoulder.

3. In a liquid heater, a liquid container, a sleeve through the bottom thereof, an electrode rigidly supported by said sleeve, a shaft through said sleeve, packing between said sleeve and said shaft and a second electrode on said shaft and capable of movement relative to said first electrode when said shaft is rotated.

4. In a liquid heater, a liquid container, a sleeve through the bottom thereof, an electrode supported by said sleeve, a shaft through said sleeve, packing between said sleeve and said shaft, resilient means causing longitudinal movement of said shaft and tightening of said packing and a second electrode on said shaft and capable of movement relative to said first electrode when said shaft is rotated.

5. In a liquid heater, a liquid container, a sleeve through the bottom thereof, an electrode supported by said sleeve, a shaft through said sleeve, packing between said sleeve and said shaft, resilient means causing longitudinal movement of said shaft and tightening of said packing, electrical connection prongs connected with said sleeve and said resilient means and a second electrode on said shaft and capable of movement relative to said first electrode when said shaft is rotated.

6. In a liquid heater, a liquid container, a sleeve through the bottom thereof, an electrode supported by said sleeve, a shaft through said sleeve, packing of insulating material between said sleeve and said shaft, means to connect said sleeve and said shaft with a source of current supply and a second electrode on said shaft and capable of movement relative to said first electrode when said shaft is rotated.

7. In a liquid heater, a liquid container, a sleeve through the bottom thereof, an electrode supported by said sleeve, a shaft through said sleeve, a manual control device exterior of said container and operatively connected with said shaft below said bottom of said container and a second electrode on said shaft and capable of movement relative to said first electrode when said shaft is rotated.

8. In a liquid heater, a liquid container having an inverted bowl shaped base, a shaft through the bottom thereof, an electrode within said container, a second electrode on said shaft and overlapping said first electrode, said shaft being rotatable to vary the degree of such overlapping and a control shaft extending laterally through said base and operatively connected within said base to said first shaft.

9. In a liquid heater, a liquid container, a shaft through the bottom thereof and having sealing engagement therewith, an electrode supported within and by said container, a second electrode on said shaft and overlapping said first electrode, said shaft being rotatable to vary the degree of such overlapping and resilient means urging said shaft toward such sealing engagement.

JOHN E. SMITH.